US005498938A

United States Patent [19]
Nilssen

[11] Patent Number: 5,498,938
[45] Date of Patent: Mar. 12, 1996

[54] HIGH-EFFICACY INCANDESCENT LIGHTING SYSTEM

[76] Inventor: Ole K. Nilssen, 408 Caesar Dr., Barrington, Ill. 60010

[21] Appl. No.: 386,186

[22] Filed: Feb. 9, 1995

Related U.S. Application Data

[63] Continuation of Ser. No. 832,642, Feb. 25, 1986.
[51] Int. Cl.$^6$ .................................................. H05B 37/02
[52] U.S. Cl. ..................... 315/312; 315/318; 315/DIG. 4
[58] Field of Search ..................... 315/312, 318, 315/DIG. 4; 362/148, 147, 158

[56] References Cited

U.S. PATENT DOCUMENTS

| | | | |
|---|---|---|---|
| 2,587,169 | 2/1952 | Kivari | 315/70 |
| 3,525,012 | 8/1970 | Dimitracopoulos | 313/113 |
| 4,001,571 | 1/1977 | Martin | 362/117 |
| 4,207,497 | 6/1980 | Capewell et al. | 315/223 |
| 4,207,498 | 6/1980 | Spira et al. | 315/210 |
| 4,349,863 | 9/1982 | Petersen | 362/20 |
| 4,443,778 | 4/1984 | Mewissen | 336/90 |
| 4,591,764 | 5/1986 | Nilssen | 315/312 |

FOREIGN PATENT DOCUMENTS

| | | |
|---|---|---|
| 2415087 | 10/1975 | Germany. |
| 2052896 | 1/1981 | United Kingdom. |

Primary Examiner—Frank Gonzalez
Assistant Examiner—Reginald A. Ratliff

[57] ABSTRACT

A lighting system comprises a number of central power supplies, with each central power supply being powered from a 277 Volt/60 Hz power line and operative to provide a voltage output of 277 Volt RMS magnitude and 30 kHz frequency to each of a plurality of special incandescent lighting fixtures.

Each special lighting fixture comprises: i) an incandescent lamp designed to be properly powered by a voltage of 24 Volt RMS magnitude, and ii) a transformer operative to convert the 277 VoltRMS/30 kHz voltage to a 24 VoltRMS/30 kHz voltage.

The reason for using 24 Volt incandescent lamps is that, at the lumen output levels normally required of light bulbs used in general lighting applications, an incandescent light bulb designed for and operated on 24 Volt RMS exhibits substantially higher efficacy and/or durability for a given lumen output level as compared with a light bulb designed for and operated on 277 Volt RMS (or 120 Volt RMS). The reason for distributing power by way of 277 VoltRMS/30 kHz instead of 277 Volt/60 Hz (or 120 Volt/60 Hz) relates to the fact that size, weight, efficiency and cost of a transformer suitable for operation on 30 kHz are very much more advantageous than would be the case at 277 Volt/60 Hz (or 120 Volt/60 Hz).

10 Claims, 3 Drawing Sheets

HIGH-EFFICACY INCANDESCENT LIGHTING SYSTEM

This application is a continuation of U.S. application Ser. No. 06/832,642 filed Feb. 25, 1986, now abandoned.

BACKGROUND OF THE INVENTION

1. Field of Invention

The present invention relates to incandescent lighting systems operative to provide general lighting at a particularly high luminous efficacy.

2. Prior Art

Previous efforts at achieving significantly improved luminous efficacies in incandescent lighting systems have been principally directed toward providing 120 Volt incandescent light bulbs of higher luminous efficacies.

Efforts of this nature have mainly focused on providing a light bulb having means operative to reflect infrared radiation back onto the incandescent filament while letting visible light escape. Examples of such efforts are provided by numerous prior art references, such as the following U.S. Pat. No. 1,342,894 to Bugbee; U.S. Pat. No. 1,425,967 to Hoffman; U.S. Pat. No. 2,859,369 to Williams et al.; U.S. Pat. No. 4,039,878 to Eijkelenboom et al.; U.S. Pat. No. 4,160,929 to Thorington et al.; U.S. Pat. No. 4,283,653 to Brett; U.S. Pat. No. 4,366,407 to Walsh; and U.S. Pat. No. 4,375,605 to Fontana et al.

However, even though the basic principle has been known for decades, and even though the potentially attainable efficacy improvement is on the order of several hundred percent, light bulbs suitable for general lighting and based on this principle of selective reflection of infrared energy are not yet available on the market. The reason for this is apparently connected with difficulties in translating the basic principle into high-volume production of corresponding cost-effective light bulbs.

SUMMARY OF THE INVENTION

Objects of the Invention

An object of the present invention is that of providing a cost-effective incandescent lighting system capable of providing light at particularly high luminous efficacy.

Another object is that of providing an incandescent lighting system wherein the light bulbs have exceptionally long life expectancies, yet without incurring the decrease in luminous efficacies normally associated with increased life expectancies.

These as well as several other important objects and advantages of the present invention will become apparent from the following description.

Brief Description

A lighting system comprises a number of spaced-apart central power supplies, with each central power supply being powered from a 277 Volt/60 Hz power line and operative to provide a voltage output of 277 Volt RMS magnitude and 30 kHz frequency to each of a plurality of special incandescent lighting fixtures.

Each special lighting fixture comprises: i) an incandescent lamp designed to be properly powered by a voltage of 24 Volt RMS magnitude, and ii) a transformer operative to convert the 277 VoltRMS/30 kHz voltage to a 24 VoltRMS/30 kHz voltage.

In the preferred embodiment, a 30 kHz auto-transformer is comprised within the base of the lighting fixture and is operative to provide 120 VoltRMS/30 kHz voltage to the fixture's ordinary Edison-type lamp socket. Another 30 kHz transformer is comprised within an adapter means operative to be screwed into the fixture's lamp socket. In turn, the adapter means is operative to receive and hold the 24 Volt incandescent light bulb, which preferably is of a Tungsten-Halogen type. However, if such a 24 Volt light bulb were to be unavailable, the adapter could be removed and an ordinary 120 Volt light bulb could be used in the fixture's lamp socket.

In an alternative preferred embodiment, a 30 kHz transformer is comprised within the base structure of the lighting fixture and is operative to provide 24 VoltRMS/30 kHz voltage to the fixture's ordinary Edison-type lamp socket; which is adapted to receive, hold and power the 24 Volt light bulb directly. However, in this embodiment, an ordinary 120 Volt light bulb could not be properly used directly in the fixture's lamp socket.

The reason for using a 277 Volt/60 Hz power line voltage to power the central power supplies relates to the fact that such power line voltage it is commonly available and provides for more efficient distribution of electric power as compared with 120 Volt/60 Hz. In ordinary incandescent lighting systems, the 277 Volt/60 Hz voltage is substantially non-feasible as a distribution voltage.

The reason for using 277 VoltRMS/30 kHz as distribution voltage from the central power supplies relates to the fact that it is easily attainable from 277 Volt/60 Hz by very simple and highly efficient full-bridge frequency-conversion means—without requiring the use any voltage transformer means. Moreover, at 30 kHz in particular, the higher-magnitude voltage provides for much lower distribution losses as compared with distributing power at 24 VoltRMS/30 kHz. Of course, at 30 kHz the special lighting fixtures can very readily be adapted to operate properly from most any level of input voltage magnitude.

The reason for using 24 Volt incandescent lamps is that, at the lumen output levels normally required of light bulbs used in general lighting applications, an incandescent light bulb designed for and operated on 24 Volt RMS exhibits substantially higher efficacy and/or durability for a given lumen output level as compared with a light bulb designed for and operated on 277 Volt RMS (or 120 Volt RMS).

Finally, the reason for providing power to the special lighting fixtures by way of 277 VoltRMS/30 kHz instead of 277 Volt/60 Hz (or 120 Volt/60 Hz) relates to the fact that size, weight, efficiency and cost of a transformer suitable for operation on 30 kHz are very much more advantageous than they would be with a transformer suitable for operation on 277 Volt/60 Hz (or 120 Volt/60 Hz).

PROBLEM SITUATION UNDERLYING THE INVENTION

Figure 1:
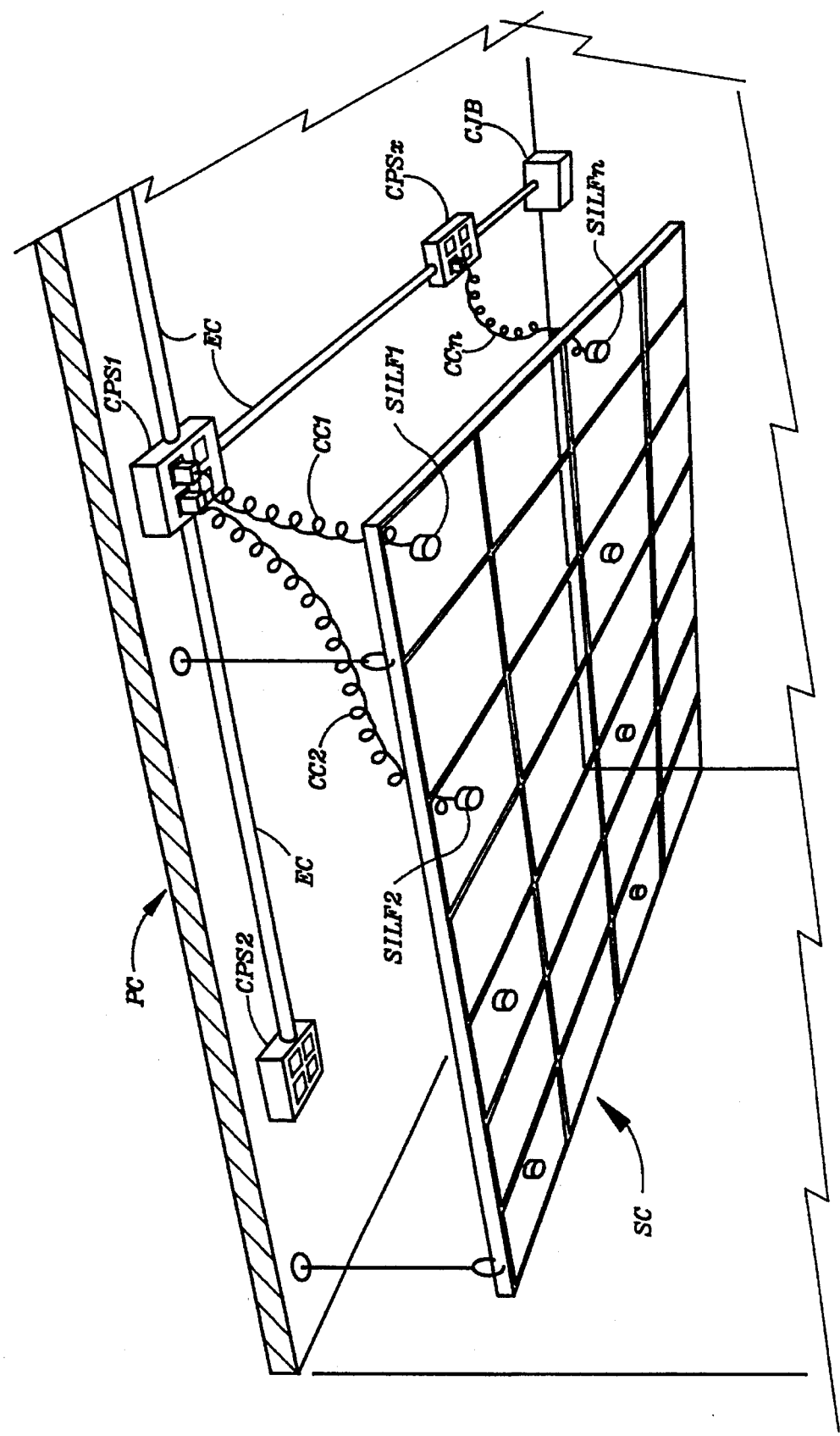
FIG. 1 illustrates the preferred embodiment of the invention and shows a system wherein frequency-converting central power supplies are mounted at spaced-apart locations on the permanent ceiling above a suspended ceiling, and wherein plural special incandescent lighting fixtures are mounted in the suspended ceiling, with each lighting fixture being individually powered from the nearest central power supply.

The present invention is fundamentally based on the recognition that significant improvements in the luminous efficacies of incandescent light bulbs can be attained by making their filaments substantially heavier than the filaments presently used in ordinary 120 Volt light bulbs.

However, a heavier filament would require an operating current of higher magnitude, and would therefore cause more power to be drawn by the filament—as long as the magnitude of the voltage applied to the filament were to remain 120 Volt.

To attain the advantages of a heavier filament without incurring increased overall lamp power, it is necessary to use a shorter filament. However, a shorter filament would require a lower-magnitude supply voltage.

For the lumen output levels associated with general incandescent lighting, and to achieve approximately maximum luminous efficacies, the RMS magnitude of the filament supply voltage should be on the order of 24 Volt to 36 Volt—a magnitude that hereinafter will be referred to as 24 Volt.

Thus, a solution to the problem of providing for a situation wherein it would be possible to use incandescent lamps with 24 Volt filaments in a general lighting system could be that of providing a voltage transformer in the base of each lamp socket, thereby to convert the 277 Volt/60 Hz or 120 Volt/60 Hz power line voltage to 24 Volt. However, the penalties in size, weight, efficiency and cost associated with so doing would make the overall proposition non-cost-effective. Moreover, with 24 Volt on the lamp sockets, ordinary 120 Volt light bulbs could not be used therein; which would represent a distinct drawback.

(It is noted that, because of excessive distribution losses, it would be non-feasible to distribute power to the lighting fixtures at 24 Volt.)

Absent other considerations, since the size and weight of a transformer is more-or-less inversely proportional to the frequency of the voltage being transformed, and if power to the lighting fixtures could be provided at a frequency substantially higher than 60 Hz, a point might be reached where the size, weight, efficiency and cost of the requisite transformer would become acceptable.

For instance, if the frequency of the voltage provided to the incandescent lighting fixtures were to be 30 kHz instead of 60 Hz, the requisite transformer would be smaller and lighter by a factor of more than 50—even after taking into account the particular characteristics of the magnetic materials required at such a high frequency. Moreover, it would then be possible to attain efficiency and cost levels that would indeed make the overall proposition cost-effective.

However, distributing power to the lighting fixtures at 30 kHz does not solve the problem associated with having 24 Volt at the fixtures' lamp sockets. To solve this problem, while at the same time keeping the advantages of distributing power at 277 Volt, it is possible to perform a dual voltage transformation within each fixture: one to convert the 277 VoltRMS/30 kHz to 120 VoltRMS/30 kHz for the lamp socket, and one to convert the 120 VoltRMS/30 kHz to 24 VoltRMS/30 kHz for the filament.

Of course, with 120 VoltRMS/30 kHz at the lamp socket, the compatibility problem associated with the use of ordinary 120 Volt light bulbs is obviated. However, it is now necessary to do the second voltage transformation at some point external of the lamp socket.

The preferred solution provided by instant invention is that of providing a compact screw-in transformer operative to convert the 120 VoltRMS/30 kHz received at the fixture's lamp socket and to provide 24 VoltRMS /30 kHz at a secondary lamp socket; which secondary lamp socket would be operative to receive and hold a compact 24 Volt Tungsten-Halogen lamp.

It is to be understood that the various individual components of the lighting system of the present invention do not represent solutions to any presently known problems.

That is , in an incandescent lighting system: i ) to distribute power at 277 VoltRMS/30 kHz (or 120 VoltRMS/30 kHz, for that matter) would serve no presently known purpose, ii) to provide this 277 VoltRMS/30 kHz power from multi-output central power supplies directly and individually to each incandescent lighting fixture would serve no presently known purpose, iii) to provide 120 VoltRMS/30 kHz to standard screw-in lamp sockets would serve no presently known purpose, and iv) to provide an screw-in adapter operable to convert 120 VoltRMS/30 kHz to 24 VoltRMS/30 kHz would serve no presently known purpose.

Yet , when combined into the lighting system herein described, the result represents a specific solution to the general problem of providing incandescent lighting having improved luminous efficacy and/or lamp life expectancy.

DESCRIPTION OF THE PREFERRED EMBODIMENT

Details of Construction

FIG. 1 illustrates the preferred embodiment of the lighting system of the present invention.

In FIG. 1, a suspended ceiling SC is shown supported underneath a permanent ceiling PC. For clarity, the grid of the suspended ceiling is shown without ceiling panels.

A 277 Volt/60 Hz power line is provided at a central junction box CJB, and is distributed therefrom by way of electrical conduit EC to a number of different central power supplies CPS1, CPS2 and CPSx mounted some distance apart on permament ceiling PC.

In the suspended ceiling are mounted a number of special incandescent lighting fixtures SILF1, SILF2 and SILFn, which are connected with central power supply CPS1 by way of connect cables CC1, CC2 and CCn, respectively.

Figure 2:
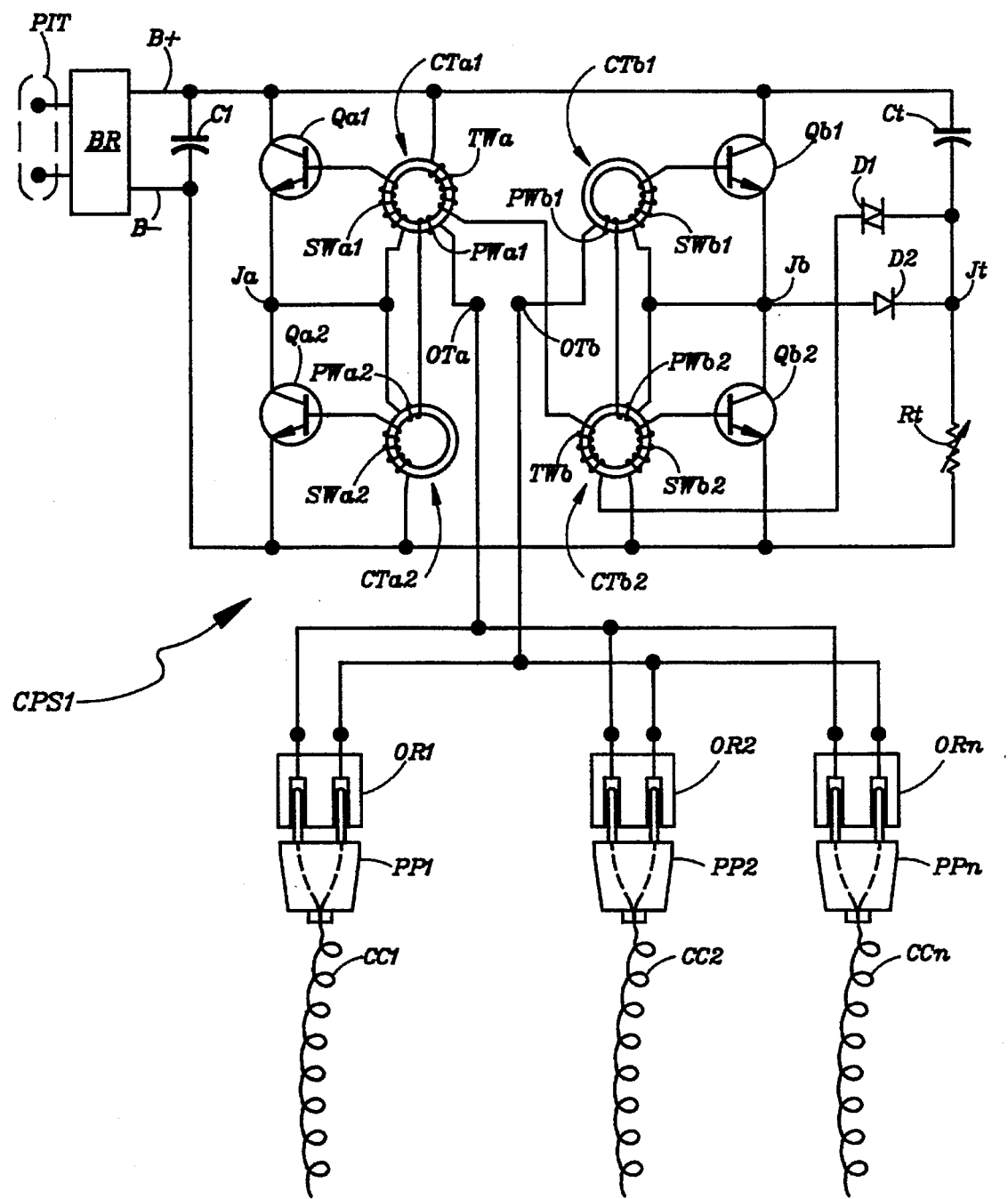
FIG. 2 is an electrical circuit diagram of a frequency-converting central power supply.

FIG. 2 is an electric circuit diagram of the 277 VoltRMS/30 kHz central power supply CPS1.

In FIG. 2, a bridge rectifier BR has a pair of power input terminals PIT adapted to connect with the 277 Volt/60 Hz power line.

The positive voltage output from rectifier BR is connected with a B+ bus; and the negative voltage output from rectifier BR is connected with a B– bus. A capacitor C1 is connected between the B+ bus and the B– bus.

A transistor Qa1 is connected with its collector to the B+ bus and with its emitter to a junction Ja. Another transistor Qa2 is connected with its collector to junction Ja and with its emitter to the B– bus.

Similarly, a transistor Qb1 is connected with its collector to the B+ bus and with its emitter to a junction Jb; while yet another transistor Qb2 is connected with its collector to junction Jb and with its emitter to the B− bus.

The base of transistor Qa1 is connected with junction Ja by way of secondary winding SWa1 on current transformer CTa1; and the base of transistor Qa2 is connected with the B− bus by way of secondary winding SWa2 of current transformer CTa2./

Similarly, the base of transistor Qb1 is connected with junction Jb by way of secondary winding SWb1 on current transformer CTb1; and the base of transistor Qb2 is connected with the B− bus by way of secondary winding SWb2 of current transformer CTb2.

An output terminal OTa is connected with junction Ja by way of series-connected primary windings PWa1 and PWa2 of current transformers CTa1 and CTa2, respectively.

Another output terminal OTb is connected with junction Jb by way of series-connected primary windings PWb1 and PWb2 of current transformers CTb1 and CTb2, respectively.

A capacitor Ct is connected between the B+ bus and a junction Jt; and an adjustable resistor Rt is connected between junction Jt and the B− bus. A Diac D1 from junction Jt to the B+ bus by way of series-connected tertiary windings TWa and TWb of current transformers CTa1 and CTb2, respectively. A diode D2 is connected with its cathode to junction Jt and with its anode to junction Jb.

With the DC supply voltage being full-wave-rectified unfiltered 277 Volt/60 Hz voltage, the output from the inverter is a 277 Volt/RMS/30 kHz voltage; which output is provided between output terminals OTa and OTb.

Multiple output receptacles OR1, OR2 and ORn are each connected with output terminals OTa and OTb. Power plugs PP1, PP2 and PPn of connect cables CC1, CC2 and CCn are plugged into output receptacles OR1, OR2 and ORn, all respectively.

Figure 3:
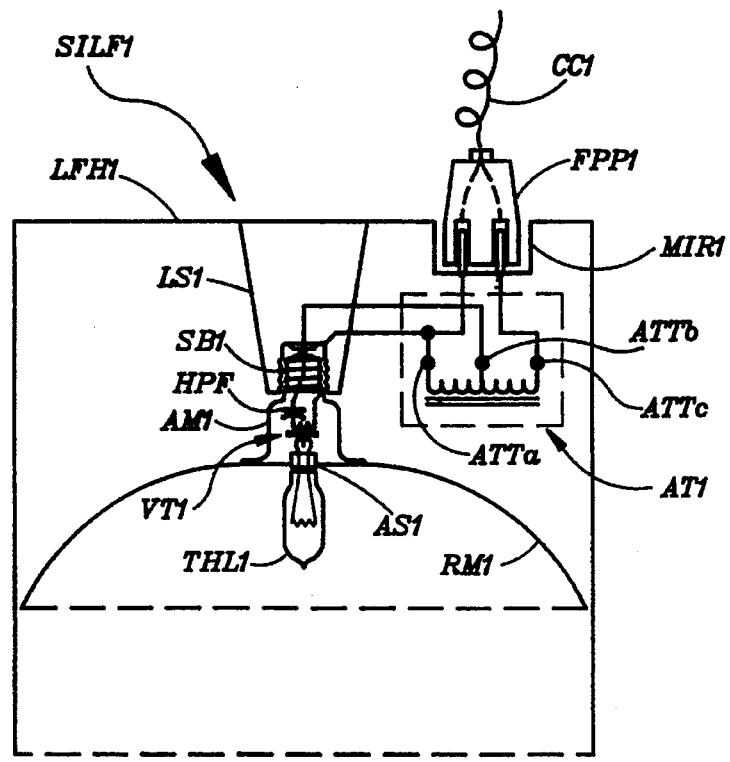
FIG. 3 shows details of the preferred version of a special incandescent lighting fixture.

FIG. 3 illustrates special incandescent lighting fixture SILF1, showing a quasi-cross-sectional view thereof.

In FIG. 3, a female power plug FPP1 on connect cable CC1 is plugged into male input receptacle MIR1, the terminals of which is connected between input terminals ATTa and ATTc of high-frequency auto-transformer AT1. Output terminals ATTa and ATTb of auto-transformer AT1 are connected with the terminals of lamp socket LS1; which lamp socket is adapted to receive and hold an ordinary Edison-type screw-in light bulb. The lamp socket is mounted on lighting fixture housing LFH1.

Screwed into lamp socket LS1 is an adapter means AM1; and inserted into an adapter socket AS1 of adapter means AM1 is a Tungsten-Halogen lamp THL1. By way of a high-pass capacitor filter HPF, a voltage transformer VT1 is connected with its primary winding to the terminals of the screw-base SB1 of adapter means AM1 and with its secondary winding with the terminals of adapter socket AS1. A reflector means RM1 is mounted on the adapter means.

Figure 4:
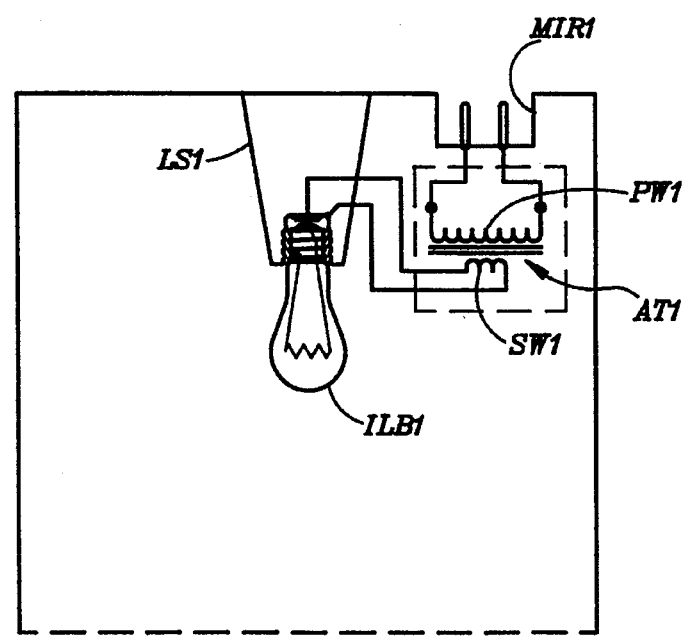
FIG. 4 shows details of an alternative version of a special incandescent lighting fixture.

FIG. 4 illustrates an alternative arrangement for the special incandescent lighting fixture.

In FIG. 4, the terminals of male input receptacle MIR1 is connected with primary winding PW1 of an alternative transformer AT1. The secondary winding SW of transformer AT1 is connected with the terminals of lamp socket LS1. A 24 Volt incandescent light bulb ILB1 is screwed into lamp socket LS1.

Details of Operation

In the incandescent lighting system of FIG. 1, the 277 Volt/60 Hz voltage supplied by the power line gets converted by each of the plural central power supplies to a 277 Volt/30 kHz voltage; which 277 Volt/30 kHz voltage is then provided at each of the multiple output receptacles of each central power supply.

Each special incandescent lighting fixture is connected with one of the multiple output receptacles of a nearby central power supply by way of a disconnectable connect cable.

Thus, each of the special incandescent lighting fixtures receives a 277 Volt/30 kHz voltage at its input; which voltage is then transformed by a transformer within the lighting fixture such as to provide 120 Volt/30 kHz at the fixture's lamp socket.

The 120 Volt/30 kHz voltage at the lamp socket can power any ordinary 120 Volt incandescent light bulb. More importantly, however, it permits the compact and cost-effective conversion of the 120 Volt/30 kHz socket voltage to a 24 Volt/30 kHz voltage suitable for powering a 24 Volt Tungsten-Halogen lamp.

This voltage-magnitude conversion is accomplished by way of a screw-in adapter; which adapter has a socket means operative to receive and hold the 24 Volt Tungsten-Halogen lamp.

Due to the high-pass filter built thereinto, no damage will result if the adapter were to be screwed into a lamp socket provided with 120 Volt/60 Hz voltage. However, the filter provides negligible impedance for frequencies of about 30 kHz and above.

Each central power supply comprises a frequency converter such as that of FIG. 2; which frequency converter, in turn, comprises a bridge rectifier (BR) operative to provide unfiltered full-wave-rectified 277 Volt/60 Hz power line voltage between the B+ bus and the B− bus.

The purpose of capacitor C1 is that of providing a low-impedance path for 30 kHz inverter currents. However, it provides substantially no filtering for the full-wave-rectified power line voltage present between the B+ bus and the B− bus.

Thus, the voltage applied to the full-bridge inverter, which consists principally of transistors Qa1, Qa2, Qb1 and Qb2, is a series of unidirectional voltage pulses provided at the rate of 120 pulses per second. The RMS magnitude of this pulsed DC voltage is approximately 277 Volt.

In other words, the RMS magnitude of the DC voltage applied to the full-bridge inverter is 277 Volt; which—as long as the inverter oscillates—makes the RMS magnitude of the inverter output voltage also 277 Volt.

Otherwise, the operation of the full-bridge inverter of FIG. 2 is entirely analogous to that of the half-bridge inverter described in U.S. Pat. No. 4,506,318 to Nilssen, including the adjustability of the RMS magnitude of the inverter output voltage.

The RMS magnitude of the output voltage of the inverter of FIG. 4 is adjustable by way of varying the magnitude of resistor Rt: a low value for Rt provides for maximum output voltage RMS magnitude, whereas higher values of Rt provides for ever decreasing magnitude.

In effect, adjusting the value of Rt in the inverter of FIG. 2 is equivalent to adjusting the value of the trigger-point-control potentiometer in an ordinary Triac light dimmer.

The inverter self-oscillates by way of current feedback provided by the four positive feedback current transformers CTa1, CTa2, CTb1 and CTb2; which means that the inverter will not oscillate without having a load connected between its output terminals OTa and OTb.

In view of the previous explanation of constructional details, the operational details of the lighting fixtures of FIG. 3 and FIG. 4 should be substantially self-evident.

Additional Comments a) The RMS magnitude of the voltage provided to the lamp socket terminals of lamp socket LS1 of FIG. 3 is about 120 Volt, while the RMS magnitude of the voltage provided to the filament of Tungsten-Halogen lamp THL1 is about 24 Volt. Thus, lamp THL1 may have a filament designed for optimal operation at 24 Volt RMS; which implies that it may be designed with the improved efficacy resulting from the use of a heavier (or thicker) filament than would be possible with a filament designed for optimal operation at 120 Volt RMS. Of course, additional efficacy improvement results from the Tungsten-Halogen cycle.

b) The RMS magnitude of the voltage provided to the lamp socket terminals of lamp socket LS1 of FIG. 4 is about 24 Volt; and incandescent light bulb ILB1 has a filament designed for optimal operation at 24 Volt RMS, thereby permitting this light bulb to be of higher efficacy than that of an ordinary light bulb of the same lumen output but having a filament designed for optimal operation at 120 Volt RMS.

c) By using 120 Volt/60 Hz as the power line voltage applied to power input terminals PIT of FIG. 2, the high-frequency voltage provided at output receptacles OR1, OR2 and ORn will be about 120 VoltRMS/30 kHz; which means that transformer AT1 of FIG. 3 then becomes unnecessary.

d) The temperatures within the lighting fixtures of FIGS. 2 and 4 are apt to be too high for ordinary electronic circuitry. However, they would not be too high for the 30 kHz transformers.

c) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:

plural frequency-converting central power supplies mounted some distance apart on a ceiling, the plural central power supplies being supplied by a single branch circuit of an ordinary electric utility power line; each power supply having plural separate power output receptacles and being operative to provide a high-frequency AC voltage at each of said plural separate power output receptacles;

for each one central power supply, a group of lighting fixtures mounted in supported relationship to the ceiling and located proximate to the one central power supply, each one fixture being connected with one of the power output receptacles of the most proximate central power supply in such manner that only a single fixture is connected with each separate power output receptacle;

such that each lighting fixture is powered individually and separately directly from a given output receptacle of the nearest central power supply, thereby minimizing the distances that power has to be transmitted from each central power supply; each of which distances is substantially shorter than 100 feet.

2. The arrangement of claim 1 wherein the frequency of the nigh-frequency AC voltage is substantially higher than that of the voltage on the power line.

3. An arrangement comprising:

a frequency-converting power supply mounted in supported relationship to a ceiling; the power supply having plural separate power output ports and being operative to provide a nigh-frequency AC voltage at each one of these ports; the high-frequency AC voltage provided at one of these ports being synchronous with the high-frequency AC voltage provided at another one of these ports; and plural lighting fixtures also mounted in supported relationship to the ceiling; each one of the plural lighting fixtures being mounted some distance away from the power supply and being disconnectably connected with one of the power output ports of the power supply by way of a flexible cord and in such manner that no more than one lighting fixture is connected with each power output port; whereby each lighting fixture is powered individually and separately directly from a given power output port of the frequency-converting power supply.

4. The arrangement of claim 3 wherein the frequency-converting power supply is located centrally with respect to the particular lighting fixtures connected with its power output ports, such that the flexible cords extend radially out from the power supply.

5. An arrangement comprising:

plural frequency-converting power supplies mounted some distance apart on a permanent ceiling above a suspended ceiling; the plural power supplies being supplied by a single branch circuit of an ordinary electric utility power line; each power supply having multiple separate power output ports and being operative to provide a high-frequency AC voltage at each one of these ports; and a group of lighting fixtures mounted in the suspended ceiling and proximate to one of the power supplies; each one of these lighting fixtures being disconnectably connected with one of the multiple power output ports of said one of the plural power supplies by way of a flexible power cord and in such manner that no more than one lighting fixture is connected with each power output port; whereby each lighting fixture is powered individually and separately directly from a given power output port of said one of the multiple power supplies.

6. An arrangement comprising:

a pair of power line terminals at which is provided ordinary power line voltage;

a lamp socket adapted to receive and hold an ordinary screw-in incandescent lamp; the lamp socket having a pair of socket terminals; and a frequency-converting power supply connected in circuit between the power line terminals and the lamp socket's socket terminals, thereby cause a high-frequency AC voltage to be present at the lamp socket; the frequency-converting power supply being characterized in that: (i) it is not connected to any loads other than than one or more lamp sockets of the type adapted to receive and hold an ordinary screw-in incandescent lamp; and (ii) it has plural separate power output ports, each providing a high-frequency AC voltage, 7. The arrangement of claim 6 wherein the frequency-converting power supply is further characterized in that the frequency of its high-frequency AC voltage is at least several times higher than the frequency of the power line voltage.

8. The arrangement of claim 6 wherein the frequency-converting power supply is further characterized by being connected in circuit between the power line terminals and a plurality of lamp sockets and pairs of lamp socket terminals.

9. The arrangement of claim 6 wherein the lamp socket is combined with a reactive impedance characterized by having a relatively high impedance at the frequency of the power line voltage and a relatively low impedance at the frequency of the high-frequency AC voltage; the relatively high impedance being at least 100 times higher than the relatively low impedance.

10. An arrangement comprising:

plural frequency-converting power supplies mounted some distance apart on a permanent ceiling above a suspended ceiling; the plural power supplies being supplied by a single branch circuit of an ordinary electric utility power line; each power supply having multiple separate power output ports and being operative to provide a high-frequency AC voltage at each one of these ports; and a group of lighting structures mounted in the suspended ceiling and proximate to one of the power supplies; each one of the lighting structures being connected, by way of a plug and receptacle combination, with one of the multiple power output ports of said one of the plural power supplies by way of a flexible power cord and in such manner that (i) no more than one lighting structure is connected with each power output port, and (ii) each one of said lighting structures is powered individually and separately directly from a given power output port of said one of the plural multi-port power supplies.

* * * * *